United States Patent
Badding et al.

(10) Patent No.: US 11,858,854 B2
(45) Date of Patent: Jan. 2, 2024

(54) GARNET-LITHIUM TITANATE COMPOSITE ELECTROLYTE

(71) Applicants: Corning Incorporated, Corning, NY (US); Shanghai Institute of Ceramics, Chinese Academy of Sciences, Shanghai (CN)

(72) Inventors: Michael Edward Badding, Campbell, NY (US); Jun Jin, Shanghai (CN); Zhen Song, Painted Post, NY (US); Jianmeng Su, Shanghai (CN); Zhaoyin Wen, Shanghai (CN); Tongping Xiu, Shanghai (CN); Chujun Zheng, Huizhou (CN)

(73) Assignees: CORNING INCORPORATED, Corning, NY (US); Shanghai Institute of Ceramics Chinese Academy of Sciences, Shanghai (CN)

( * ) Notice: Subject to any disclaimer, the term of this patent is extended or adjusted under 35 U.S.C. 154(b) by 321 days.

(21) Appl. No.: 17/308,646

(22) Filed: May 5, 2021

(65) Prior Publication Data

US 2021/0347697 A1 Nov. 11, 2021

(30) Foreign Application Priority Data

May 8, 2020 (CN) .......................... 202010381814.X (51) Int. Cl.
- C04B 35/48 (2006.01)
- C04B 35/465 (2006.01)
- H01M 10/0525 (2010.01)
- H01M 10/0562 (2010.01)

(52) U.S. Cl.
CPC ............ *C04B 35/48* (2013.01); *C04B 35/465* (2013.01); *H01M 10/0525* (2013.01); *H01M 10/0562* (2013.01); C04B 2235/764 (2013.01); C04B 2235/77 (2013.01); H01M 2300/0077 (2013.01)

(58) Field of Classification Search
CPC ....... C04B 35/48; C04B 35/50; C04B 35/465; H01M 10/0562
See application file for complete search history.

(56) References Cited

U.S. PATENT DOCUMENTS

| | | |
|---|---|---|
| 2016/0293947 A1 | 10/2016 | Tamura et al. |
| 2019/0006707 A1 | 1/2019 | Sakamoto et al. |

FOREIGN PATENT DOCUMENTS

| | | |
|---|---|---|
| JP | 2014-110149 A | 6/2014 |

OTHER PUBLICATIONS

Basappa et al., "Grain boundary modification to suppress lithium penetration through garnet-type solid electrolyte", In Journal of Power Sources, vol. 363, 2017, pp. 145-152.

(Continued)

*Primary Examiner* — Sarah A. Slifka (57) ABSTRACT

A sintered composite ceramic includes: a lithium-garnet major phase; and a lithium-rich minor phase, such that the lithium-rich minor phase has $Li_xTiO_{(x+4)/2}$, with $0.66 \leq x \leq 4$. The sintered composite ceramic may exhibit a relative density of at least 90% of a theoretical maximum density of the ceramic, an ionic conductivity of at least 0.35 mS·cm$^{-1}$, or a critical current density (CCD) of at least 1.0 mA·cm$^{-2}$.

20 Claims, 4 Drawing Sheets

(56) References Cited

OTHER PUBLICATIONS

Cheng et al., "Intergranular Li metal propagation through polycrystalline Li6.25Al0.25La3Zr2O12 ceramic electrolyte", Article in Electrochimica Acta, vol. 223, Dec. 2016, pp. 8.
Huang et al., "Searching for low-cost LixMOy compounds for compensating Li-loss in sintering of Li-Garnet solid electrolyte", In Journal of Materiomics, vol. 5, Issue 2, 2019, pp. 221-228.
Liu et al., "Ultra-stable lithium plating/stripping in garnet-based lithium-metal batteries enabled by a SnO2 nanolayer", In Journal of Power Sources, vol. 433, 2019.
Ren et al., "Direct observation of lithium dendrites inside garnet-type lithium-ion solid electrolyte", In Electrochemistry Communications, vol. 57, 2015, pp. 27-30.
Ruan et al., "Acid induced conversion towards a robust and lithiophilic interface for Li—Li7La3Zr2O12 solid-state batteries", In Journal of Materials Chemistry A 2019, vol. 7, Issue 24, pp. 14565-14574.
Song et al., "Revealing the Short-Circuiting Mechanism of Garnet-Based Solid-State Electrolyte" In Advanced Energy Materials, vol. 9, Issue 21, 2019.
Xu et al., "Li3PO4-added garnet-type Li6.5La3Zr1.5Ta0.5O12 for Li-dendrite suppression", Journal of Power Sources, vol. 354, Jun. 30, 2017, pp. 68-73.

GARNET-LITHIUM TITANATE COMPOSITE ELECTROLYTE

BACKGROUND

This application claims the benefit of priority under 35 U.S.C. § 119 of Chinese Patent Application Serial No. 202010381814.X, filed on May 8, 2020, the content of which is relied upon and incorporated herein by reference in its entirety.

1. Field

This disclosure relates to lithium-garnet composite ceramic electrolytes with improved critical current density (CCD).

2. Technical

Conventional lithium (Li)-ion batteries have been widely studied but still suffer from limited capacity density, energy density, and safety concerns, posing a challenge for large-scale application in electrical equipment. For example, while solid-state lithium batteries based on Li-garnet electrolyte (LLZO) address the safety concerns, insufficient contact between the Li anode and garnet electrolyte due to the rigid ceramic nature and poor lithium wettability of garnet, as well as surface impurities, often lead to large polarization and large interfacial resistances, thereby causing inhomogeneous deposition of lithium and lithium dendrites formation.

Thus, as a result of poor contact between the Li anode and garnet electrolyte, the battery may experience a low critical current density (CCD) and eventual short circuiting.

The present application discloses improved lithium-garnet composite ceramic electrolytes for enhanced grain boundary bonding of Li-garnet electrolytes in solid-state lithium metal battery applications.

SUMMARY

In some embodiments, a sintered composite ceramic, comprises: a lithium-garnet major phase; and a lithium-rich minor phase, wherein the lithium-rich minor phase comprises $Li_xTiO_{(x+4)/2}$, with $0.66 \leq x \leq 4$.

In one aspect, which is combinable with any of the other aspects or embodiments, the lithium-garnet major phase comprises at least one of: (i) $Li_{7-3a}La_3Zr_2L_aO_{12}$, with L=Al, Ga or Fe and $0<a<0.33$; (ii) $Li_7La_{3-b}Zr_2MbO_{12}$, with M=Bi or Y and $0<b<1$; (iii) $Li_{7-c}La_3(Zr_{2-c}N_c)O_{12}$, with N=In, Si, Ge, Sn, V, W, Te, Nb, or Ta and $0<c<1$, or a combination thereof.

In one aspect, which is combinable with any of the other aspects or embodiments, a mass ratio of lithium-garnet major phase to lithium-rich minor phase is in a range of 100:2 to 100:8.

In one aspect, which is combinable with any of the other aspects or embodiments, the ceramic has a relative density of at least 90% of a theoretical maximum density of the ceramic.

In one aspect, which is combinable with any of the other aspects or embodiments, the ceramic has an ionic conductivity of at least 0.35 $mS \cdot cm^{-1}$.

In one aspect, which is combinable with any of the other aspects or embodiments, the ceramic has a critical current density (CCD) of at least 1.0 $mA \cdot cm^{-2}$.

In one aspect, which is combinable with any of the other aspects or embodiments, the ceramic has a critical current density (CCD) of at least 1.5 $mA \cdot cm^{-2}$.

In some embodiments, a sintered composite ceramic, comprises: a lithium-garnet major phase; and a lithium-rich minor phase, wherein the lithium-rich minor phase comprises at least one of: $Li_2TiO_3$, $Li_4Ti_5O_{12}$, $Li_2Ti_3O_7$, $Li_4TiO_4$, or a combination thereof.

In one aspect, which is combinable with any of the other aspects or embodiments, the lithium-garnet major phase comprises at least one of: (i) $Li_{7-3a}La_3Zr_2L_aO_{12}$, with L=Al, Ga or Fe and $0<a<0.33$; (ii) $Li_7La_{3-b}Zr_2MbO_{12}$, with M=Bi or Y and $0<b<1$; (iii) $Li_{7-c}La_3(Zr_{2-c}N_c)O_{12}$, with N=In, Si, Ge, Sn, V, W, Te, Nb, or Ta and $0<c<1$, or a combination thereof.

In one aspect, which is combinable with any of the other aspects or embodiments, a mass ratio of lithium-garnet major phase to lithium-rich minor phase is in a range of 100:2 to 100:8.

In some embodiments, a battery, comprises: at least one lithium electrode; and an electrolyte in contact with the at least one lithium electrode, wherein the electrolyte is a lithium-garnet composite electrolyte comprising any of the sintered composite ceramics disclosed herein.

In some embodiments, a method of making the composite ceramic, comprises: a first mixing of inorganic source materials to form a mixture, including a lithium source compound and at least one transition metal compound; a first milling of the mixture to reduce the particle size of the precursors; calcining the milled mixture to form a garnet oxide at from 800 to 1200° C.; a second mixing of the milled and calcined garnet oxide with at least one minor phase additive to form a second mixture; a second milling of the second mixture to reduce the particle size of constituents of the second mixture; compacting the second milled second mixture into a green pellet; and sintering the green pellet at a temperature ranging from 1000° C. to 1300° C., wherein the minor phase additive comprises $Li_xTiO_{(x+4)/2}$, with $0.66 \leq x \leq 4$.

In one aspect, which is combinable with any of the other aspects or embodiments, at least one of the lithium source compound or the minor phase additive is present in a stoichiometric excess.

In one aspect, which is combinable with any of the other aspects or embodiments, a mass ratio of the milled and calcined garnet oxide to the at least one minor phase additive is in a range of 100:2 to 100:8.

In one aspect, which is combinable with any of the other aspects or embodiments, no mother powder is applied with the green pellet in the sintering step.

In one aspect, which is combinable with any of the other aspects or embodiments, mother powder is applied with the green pellet in the sintering step.

In some embodiments, a sintered composite ceramic, comprises: a lithium-garnet major phase; and a lithium-rich minor phase, wherein a mass ratio of lithium-garnet major phase to lithium-rich minor phase is in a range of 100:2 to 100:8, and wherein the ceramic comprises at least one of: (i) a relative density of at least 90% of a theoretical maximum density of the ceramic, (ii) an ionic conductivity of at least 0.35 $mS \cdot cm^{-1}$, and (iii) a critical current density (CCD) of at least 1.0 $mA \cdot cm^{-2}$.

In one aspect, which is combinable with any of the other aspects or embodiments, the ceramic has a critical current density (CCD) of at least 1.5 $mA \cdot cm^{-2}$.

BRIEF DESCRIPTION OF THE DRAWINGS

The disclosure will become more fully understood from the following detailed description, taken in conjunction with the accompanying figures, in which.

DETAILED DESCRIPTION

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments. It should be understood that the present application is not limited to the details or methodology set forth in the description or illustrated in the figures. It should also be understood that the terminology is for the purpose of description only and should not be regarded as limiting.

Additionally, any examples set forth in this specification are illustrative, but not limiting, and merely set forth some of the many possible embodiments of the claimed invention. Other suitable modifications and adaptations of the variety of conditions and parameters normally encountered in the field, and which would be apparent to those skilled in the art, are within the spirit and scope of the disclosure.

Definitions

"Major phase," "first phase," or like terms or phrases refer to a physical presence of a lithium garnet in greater than 50% by weight, by volume, by mols, or like measures in the composition.

"Minor phase," "second phase," or like terms or phrases refer to a physical presence of a lithium dendrite growth inhibitor (i.e., grain boundary bonding enhancer) in less than 50% by weight, by volume, by mols, or like measures in the composition.

"SA," "second additive," "second phase additive," "second phase additive oxide," "phase additive oxide," "additive oxide," "additive," or like terms refer to an additive oxide that produces a minor phase or second minor phase within the major phase when included in the disclosed compositions.

"LLZO" or like terms refer to compounds comprising lithium, lanthanum, zirconium, and oxygen elements. For example, lithium-garnet electrolyte comprises at least one of: (i) $Li_{7-3a}La_3Zr_2L_aO_{12}$, with L=Al, Ga or Fe and $0<a<0.33$; (ii) $Li_7La_{3-b}Zr_2M_bO_{12}$, with M=Bi or Y and $0<b<1$; (iii) $Li_{7-c}La_3(Zr_{2-c}N_c)O_{12}$, with N=In, Si, Ge, Sn, V, W, Te, Nb, or Ta and $0<c<1$, or a combination thereof.

"Include," "includes," or like terms means encompassing but not limited to, that is, inclusive and not exclusive.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

For example, in modifying the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, "about" or similar terms refer to variations in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" (or similar terms) also encompasses amounts that differ due to aging of a composition or formulation with a particular initial concentration or mixture and amounts that differ due to mixing or processing a composition or formulation with a particular initial concentration or mixture.

As utilized herein, "optional," "optionally," or the like are intended to mean that the subsequently described event or circumstance can or cannot occur, and that the description includes instances where the event or circumstance occurs and instances where it does not occur. The indefinite article "a" or "an" and its corresponding definite article "the" as used herein means at least one, or one or more, unless specified otherwise.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, times, and like aspects, and ranges thereof, are for illustration only; they do not exclude other defined values or other values within defined ranges. The compositions, articles, and methods of the disclosure can include any value or any combination of the values, specific values, more specific values, and preferred values described herein, including explicit or implicit intermediate values and ranges.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

As explained above, solid-state lithium batteries based on Li-garnet electrolyte (LLZO) often suffer from insufficient contact between the Li anode and garnet electrolyte, which often leads to the battery experiencing a low critical current density (CCD) and eventual short circuiting. Conventional approaches to address these issues have included: (A) $H_3PO_4$ acid treatments for removing impurities while forming a protective interlayer of $Li_3PO_4$ to increase CCD of the electrolyte to 0.8 mA·cm$^{-2}$ and (B) modifying the electrolyte-anode interface with $SnO_2$ and $MoS_2$ to form Sn, Mo, and related alloy interlayers. However, it was found that for these proposals, as the battery circulates, the interlayers gradually become exhausted and result in eventual battery failure. Moreover, these interlayers do not increase the resistance of the electrolyte itself against lithium dendrite growth.

Composite ceramic electrolytes are effective in improving bonding at the major phase grain boundary, thereby improving CCD by minimizing lithium dendrite growth. Critical current density (CCD) refers to the maximum current density that LLZO electrolyte can tolerate before lithium dendrite penetration occurs in the electrolyte, which affects the dendrite suppression capability of the electrolyte. By adding additives during the LLZO sintering process, the additive or its decomposition product aggregates at the grain boundary to enhance grain boundary bonding and block lithium dendrite growth. Current efforts at studying additives have included (i) LiOH·$H_2O$ in LLZO to form a minor phase of $Li_2CO_3$ and LiOH or (ii) adding $Li_3PO_4$ to LLZO precursor and allowing $Li_3PO_4$ to remain as the minor phase at the grain boundaries by controlling sintering conditions or (iii) adding $LiAlO_2$-coated LLZO particles to obtain a Li-garnet composite ceramic electrolyte. However, none of (i) to (iii), can achieve a desired CCD to meet the requirements of practical applications.

Disclosed herein is a Li-garnet composite ceramic electrolyte prepared by adding a lithium-rich additive (e.g., $Li_xTiO_{(x+4)/2}$ (0.66≤x≤4), "LTO"), into LLZO with optional elemental doping (e.g., at least one of In, Si, Ge, Sn, V, W, Te, Nb, Ta, Al, Ga, Fe, Bi, Y, etc.), during LLZO ceramic sintering, according to some embodiments. In some embodiments, while variations of LTO include $Li_2TiO_3$, $Li_4Ti_5O_{12}$, $Li_2Ti_3O_7$, and $Li_4TiO_4$, the sintering atmosphere is mainly $Li_2TiO_3$ and $Li_4TiO_4$. $Li_2Ti_3O_7$ and $Li_4Ti_5O_{12}$ as a second phase may gather at the LLZO grain boundary. Elemental dopants may be used to stabilize LLZO into a cubic phase with at least one of In, Si, Ge, Sn, V, W, Te, Nb, Ta, Al, Ga, Fe, Bi, Y, etc.

The composite ceramic comprises a major LLZO phase and a minor LTO second phase. The addition of lithium-rich additive during sintering reduces sintering temperature of LLZO and creates a lithium atmosphere for LLZO sintering, which simplifies the sintering process and reduces its cost. The lithium-rich additives and their decomposition products are distributed at the LLZO grain boundary, which enhances bonding at the LLZO grain boundary and blocks formation of lithium dendrite growth. The CCD of the Li-garnet composite described herein is at least 1.5 mA·cm$^{-2}$.

Methods for Preparation of Li-Garnet Composite Ceramic Electrolyte

First Mixing Step

In the first mixing step, a stoichiometric amount of inorganic materials is mixed together, in the formula of garnet oxides and, for example, milled into fine powder. The inorganic materials can be, for example, a lithium compound and at least one transition metal compound (e.g., La-based, Zr-based, etc.). In some embodiments, the inorganic materials compounds may also comprise at least one of Al, Ga, Fe, Bi, Y, In, Si, Ge, Sn, V, W, Te, Nb, Ta, Mg, or combinations thereof in the chemical formula.

In some embodiments, it may be desirable to include an excess of a lithium source material in the starting inorganic batch materials to compensate for the loss of lithium during the high temperature of from 1000° C. to 1300° C. (e.g., 1100° C. to 1200° C.) sintering step. The first mixing step can be a dry milling process, or a wet milling process with an appropriate liquid that does not dissolve the inorganic materials. The mixing time, such as from several minutes to several hours, can be adjusted, for example, according to the scale or extent of the observed mixing performance (e.g., 1 min to 48 hrs, or 30 mins to 36 hrs, or 1 hr to 24 hrs (e.g., 12 hrs), or any value or range disclosed therein). The milling can be achieved by, for example, a planetary mill, an attritor, or like mixing or milling apparatus.

Calcining Step

In the calcining step, the mixture of inorganic material, after the first mixing step, is calcined at a predetermined temperature, for example, at from 800° C. to 1200° C. (e.g., 950° C.), including intermediate values and ranges, to react and form the target Li-garnet. The predetermined temperature depends on the type of the Li-garnet. The calcination time, for example, varies from 1 hr to 48 hrs (e.g., 2 hrs to 36 hrs, or 3 hrs to 24 hrs, or 4 hrs to 12 hrs (e.g., 6 hrs), or any value or range disclosed therein), and also may depend upon on the relative reaction rates of the selected inorganic starting or source batch materials. In some embodiments, a pre-mix of inorganic batch materials can be milled and then calcinated or calcined, as needed, in a first step.

Second Mixing Step

The calcined Li-garnet mixture and minor or second phase additives are mixed together and ground to form a mixture of a homogeneous composition (e.g., as determined by the LTO distribution in green ceramic pellets or bars). LTO minor phase was prepared in similar manner as described in the First Mixing (milling for 30 mins to 36 hrs, e.g., 24 hrs) and Calcining (e.g., for 12 hrs to 24 hrs) steps. The second mixing step can include, for example, one or more of: a wet-milling, a dry-milling, or a combination thereof. During milling of the mixture, one can optionally heat the mixture at a low temperature of, for example, from 60° C. to 100° C. (e.g., 70° C.) to remove adsorbed moisture or solvents.

Compacting Step

The homogeneous second mixture composition was pulverized simultaneously during the second mixing step. After drying at temperatures ranging from 60° C. to 100° C. (e.g., 70° C.) for a time ranging from 6 hrs to 24 hrs (e.g., 12 hrs), the second mixture composition was compacted by passing through a 200-grit sieve to form a green pellet. The green pellet may be formed as arbitrary shapes by any suitable method, for example, cold isotropic pressing, hot isotropic pressing, hot pressing, uniaxial pressing, or by like means and instrumentalities. The green pellet may have at least one dimension ranging from 1 mm to 30 mm (e.g., ~20 mm). The green pellet is then sintered at a temperature greater than the temperature of the calcining step, as described below.

Sintering Step

During the sintering step, the green pellet was placed in a crucible with a lid (e.g., Pt, $ZrO_2$, $Al_2O_3$ and MgO crucible). The sintering temperature was, for example, from 1000 to 1300° C., including intermediate values and ranges, with a temperature ramping rate (pre-sintering) and cooling rate (post-sintering) ranging from 0.5° C./min to 10° C./min (e.g., 5° C./min).

EXAMPLES

Example 1—Li-Garnet (LLZO) Electrolyte Preparation

Precursor powder LiOH·H$_2$O (AR, 2% excess), La$_2$O$_3$ (99.99%, calcined at 900° C. for 12 hours), ZrO$_2$ (AR), and Ta$_2$O$_5$ (99.99%) were weighed and mixed according to the stoichiometric ratio of Li$_{6.5}$La$_3$Zr$_{1.5}$Ta$_{0.5}$O$_{12}$. Wet ball milling was conducted for 12 hours via yttrium-stabilized zirconia (YSZ) balls as the grinding medium at a speed of 250 rpm using isopropanol as the solvent. The dried mixture powder was calcined in an alumina crucible at 950° C. for 6 hours to obtain pure cubic Li-garnet electrolyte powder.

In some embodiments, the solid electrolyte is a Li-garnet ceramic electrolyte LLZO with a chemical formula of one or more of Li$_{7-3a}$La$_3$Zr$_2$L$_a$O$_{12}$ (L=Al, Ga or Fe; 0<a<0.33), Li$_7$La$_{3-b}$Zr$_2$M$_b$O$_{12}$ (M=Bi or Y; 0<b<1), and Li$_{7-c}$La$_3$(Zr$_{2-c}$, N$_c$)O$_{12}$ (N=In, Si, Ge, Sn, V, W, Te, Nb, Ta; 0<c<1).

Example 2—Preparation of Li-Garnet Composite Ceramic Electrolyte (LLZO-LTO)

The LLZO powder of Example 1 and LTO powder (Li$_2$TiO$_3$, Alfa) were weighed in a predetermined ratio and wet-milled at 250 rpm for 12 hours using the same techniques described above. The obtained mixture was dried at 70° C. for 12 hours and then passed through a 200-grit sieve. A green pellet (1.25 grams) with a diameter of 18 mm was formed by uniaxial pressing at a pressure of 140 MPa. Thereafter, the green body was placed in an Al$_2$O$_3$, MgO or Pt crucible and sintered at 1190° C. for 30 minutes to obtain LLZO-LTO. Temperature ramping rate and cooling rate pre- and post-sintering, respectively, was conducted at 5° C./min. The mother powder was not used in the sintering process in this experiment. Li$_x$TiO$_{(x+4)/2}$, includes, but is not limited to: Li$_2$TiO$_3$, Li$_4$Ti$_5$O$_{12}$, Li$_2$Ti$_3$O$_7$, Li$_4$TiO$_4$.

Optionally, mother powder (Li$_{6.5}$La$_3$Zr$_{1.5}$Nb$_{0.5}$O$_{12}$) may also be used to compensate Li-garnet (LLZO) electrolyte samples' lithium loss during sintering. The synthesis process for the mother powder is similar to that for preparing LLZO as described herein (e.g., Example 1), except with excessive lithium content in the precursor powder (e.g., 15%). While sintering to prepare LLZO, the green pellet may optionally be covered by a mother powder to prevent loss of volatile components (Li$_2$O) and avoid the presence of a lithium-deficient phase (La$_2$Zr$_2$O$_7$). At the same time, the presence of a Li$_2$O atmosphere promotes densification of LLZO.

Example 3—Preparation of Coin Cell

LLZO-LTO electrolyte pellets prepared in Example 2 were polished first with 400-grit and second with 1200-grit SiC sandpaper, followed by Au-sputtering thereon for 5 minutes. After transferring to an argon-filled glove box, the cell was assembled by positioning lithium metal foil at a center portion of a first LLZO-LTO sample surface and heating it to 250-300° C. on a hot plate. Because of the heating, molten lithium spreads across the first surface of the pellet. Thereafter, the sample was rotated, followed by the same lithium metal positioning and heating steps to a second LLZO-LTO sample surface. The Li/LLZO-LTO/Li symmetrical battery was finally sealed in a CR2032 coin cell.

Example 4—Characterization Techniques

Morphology and Phase Analysis

Scanning electron microscopy (SEM) images were obtained by a scanning electron microscope (Hitachi, S-3400N). Element mapping images were characterized by an energy dispersive spectrometer (EDS) affiliated with the HITACHI SEM. X-ray powder diffraction (XRD) patterns were obtained by x-ray powder diffraction (Rigaku, Ultima IV, nickel-filtered Cu—Kα radiation, λ=1.542 Å) in the 2θ range of 10-80° at room temperature. Density of the ceramic samples was measured by the Archimedes method with ethanol as the immersion medium.

Electrochemical Impedance Spectroscopy (EIS)

EIS was measured by AC impedance analysis (Autolab, Model PGSTAT302 N) with a frequency range of 0.1 Hz to 1 MHz.

Electrochemical Performance

All Li symmetric cells and the full battery were tested on a LAND CT2001A battery test system (Wuhan, China). The Li/LLZO-LTO/Li symmetrical battery prepared in Example 3 was subjected to a rate cycling test at an initial current density of 0.1 mA·cm$^{-2}$, followed by increments of 0.1 mA·cm$^{-2}$ to determine the critical current density (CCD) of LLZO-LTO. Charge and discharge durations were set to 30 minutes. All battery tests were performed at 25° C.

Example 5—Sample Preparation and Characterization

Sample 1

Li-garnet electrolyte (LLZO) and lithium-titanium composite oxide (Li$_2$TiO$_3$, LTO) were weighed at a mass ratio of 100:2 (40 g of LLZO, 0.8 g of LTO in 120 g isopropyl alcohol). Wet ball milling was conducted for 12 hours by using yttrium-stabilized zirconia (YSZ) beads as a grinding medium at a speed of 250 rpm. Particle size distribution (D90) ranged between 1.2 μm and 1.7 μm. The obtained mixture was dried at 70° C. for 12 hours and then passed through a 200-grit sieve. A green pellet (1.25 grams) with a diameter of 18 mm was formed by uniaxial pressing at a pressure of 140 MPa. Thereafter, the green body was placed in a Pt crucible and sintered at 1190° C. for 30 minutes, the temperature ramping rate (pre-sintering) and cooling rate (post-sintering) both being 5° C./min.

Sample 2

Preparation was the same as in Sample 1, except the Li-garnet electrolyte LLZO and lithium-titanium composite oxide LTO were ball milled at a mass ratio of 100:4.

Sample 3

Preparation was the same as in Sample 1, except the Li-garnet electrolyte LLZO and lithium-titanium composite oxide LTO were ball milled at a mass ratio of 100:6.

Sample 4

Preparation was the same as in Sample 1, except the Li-garnet electrolyte LLZO and lithium-titanium composite oxide LTO were ball milled at a mass ratio of 100:8.

Comparative Sample 1

Li-garnet electrolyte (LLZO) powder was wet ball milled for 12 hours by using yttrium-stabilized zirconia (YSZ) beads as a grinding medium at a speed of 250 rpm. Particle size distribution (D90) ranged between 1.2 μm and 1.7 μm. The obtained mixture was dried at 70° C. for 12 hours and then passed through a 200-grit sieve. A green pellet (1.25 grams) with a diameter of 18 mm was formed by uniaxial pressing at a pressure of 140 MPa. Thereafter, the green body was placed in a MgO crucible and sintered at 1190° C. for 30 minutes, with 0.4 g mother powder per pellet ($Li_{6.5}La_3Zr_{1.5}Nb_{0.5}O_{12}$; Li excess 15%) during LLZO sintering.

Comparative Sample 2

Preparation was the same as in Comparative Sample 1, except that no mother powder was added.

Table 1 shows selected preparation conditions and performance attributes for Samples 1-4 and Comparative Samples 1 and 2. Common phases of LTO include $Li_2TiO_3$, $Li_4Ti_5O_{12}$, $Li_2Ti_3O_7$, $Li_4TiO_4$, etc., each of which can provide a sintering atmosphere. LTO with high lithium content is relatively easy to decompose to produce $Li_2O$. The sintering atmosphere is mainly provided by $Li_2TiO_3$ and $Li_4TiO_4$. $Li_2Ti_3O_7$ and $Li_4Ti_5O_{12}$ as a second phase may gather at the LLZO grain boundary. $Li_2TiO_3$ exemplified as the choice for LTO to illustrate the role of LTO.

TABLE 1

| Sample | LLZO:LTO Mass Ratio | Relative Density (%) | Ionic Conductivity (mS · cm$^{-1}$) | CCD (mA · cm$^{-2}$) |
|---|---|---|---|---|
| Comparative 1 | 0 | 93.6 | 0.687 | 0.4 |
| Comparative 2 | 0 | 76.99 | 0.0123 | — |
| 1 | 100:2 | 94.72 | 0.494 | 0.9 |
| 2 | 100:4 | 95.62 | 0.429 | 1.5 |
| 3 | 100:6 | 94.10 | 0.365 | 1.1 |
| 4 | 100:8 | 93.78 | 0.361 | 1.0 |

Figure 1:
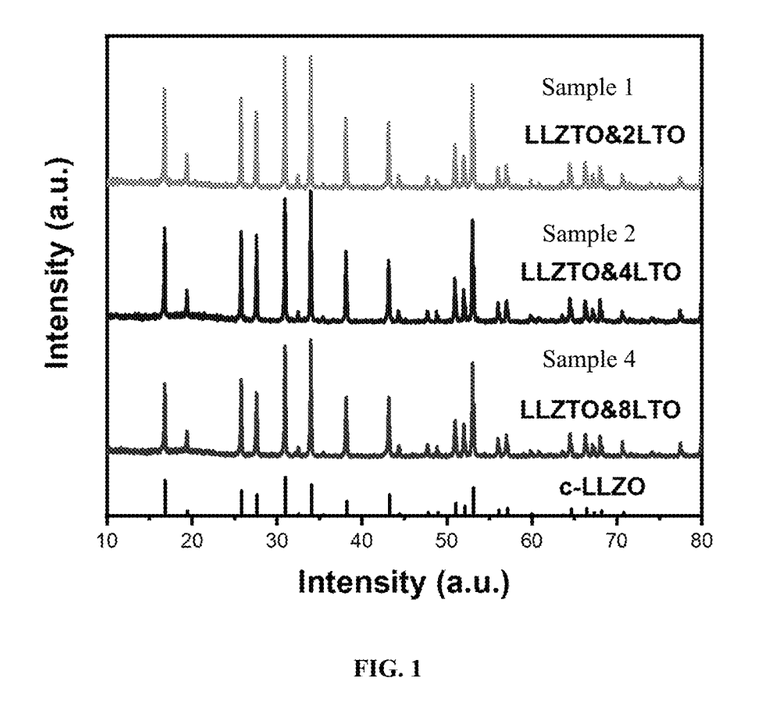
FIG. 1 illustrates an x-ray diffraction (XRD) pattern of Li-garnet composite ceramic electrolytes of Samples 1, 2, and 4, according to some embodiments.

FIG. 1 illustrates an x-ray diffraction (XRD) pattern of Li-garnet composite ceramic electrolytes of Samples 1, 2, and 4, according to some embodiments. The XRD peaks of each of Samples 1 (LLZO:LTO=100:2), 2 (LLZO:LTO=100:4), and 4 (LLZO:LTO=100:8) indicate a close match with the XRD fingerprints of the control cubic Li-garnet electrolyte PDF #45-0109 sample, confirming that addition of LTO does not affect the phase composition of LLZO.

In some embodiments, a mass ratio of lithium-garnet major phase to lithium-rich minor phase is in a range of 100:2 to 100:8. Because $Li_2O$ affects grain growth and densification processes of LLZO, too low of a LLZO:LTO ratio may have insufficient lithium atmosphere, resulting in low densification. Too high of a LLZO:LTO ratio (e.g., LLZO:LTO mass ratio of 1:1) results in unwanted amounts of heterophases (e.g., $LaTiO_3$, $LaTaO_4$, $ZrTiO_4$, etc.) being formed. Moreover, at too high LLZO:LTO ratios, the major phase of the composite may also be adversely affected. Here, c-LLZO can be determined as the absolute major phase of LLZO-LZO in a range of 100:2 to 100:8.

Pristine LLZO (e.g. $Li_7La_3Zr_2O_{12}$) has cubic (c-LLZO) and tetragonal (t-LLZO) phases at different temperature. The c-LLZO has a higher ionic conductivity than t-LLZO (c-LLZO at $10^{-3}$~$10^{-4}$ S·cm$^{-1}$ versus t-LLZO at $10^{-5}$~$10^{-6}$ S·cm$^{-1}$). The tetragonal phase is a room-temperature stable phase, and it is often necessary to introduce doped ions (e.g., at least one of In, Si, Ge, Sn, V, W, Te, Nb, Ta, Al, Ga, Fe, Bi, Y, etc.) to stabilize cubic phase at room temperature. According to the XRD results of FIG. 1, no t-LLZO phase was detected. Thus, the LLZO used here (e.g., $Li_{6.5}La_3Zr_{1.5}Ta_{0.5}O_{12}$) can be regarded as a single-phase material. For at least this reason, it is important LTO does not affect the phase composition of LLZO.

Table 1 above presents selected preparation conditions and performance attributes for Samples 1-4 and Comparative Samples 1 and 2. Comparative Sample 2, in which no mother powder was used and no LTO was added into Li-garnet powder, was not well-sintered, as indicated by the low relative density (as compared to a theoretical maximum density of the ceramic) (76.99%) in comparison with other samples which exceed 90%. Comparative Sample 1, in which mother powder was used but no LTO was added into Li-garnet powder, is able to achieve relative density values comparable to the average of Samples 1-4 (Comparative 1: 93.6% vs Average for Samples 1-4: 94.56%) but not able to achieve CCD values comparable to the average of Samples 1-4 (Comparative 1: 0.4 mA·cm$^{-2}$ vs Average for Samples 1-4: 1.125 mA·cm$^{-2}$) or even come close to CCD value for Sample 2 (1.5 mA·cm$^{-2}$). The sintering mechanism of LLZO is a gas-liquid-solid process. $Li_2O$ gas condenses into a liquid phase on the surface of the LLZO particles. Dissolution-precipitation promotes material transport, resulting in grain growth and enhanced densification. Both the mother powder and LTO can provide a $Li_2O$ atmosphere for LLZO sintering whereby LLZO obtains a $Li_2O$ atmosphere from the outside and the inside, respectively.

Relative density of Samples 1-4, which comprise LTO increases when firing at 1190° C., suggesting that LTO may help to densify garnet and lower the sintering temperature. As stated above, release of $Li_2O$ by LTO promotes LLZO densification. As stated in Example 2 describing the preparation of Li-garnet composite ceramic electrolytes of Samples 1-4, mother powder was not used in the sintering process for Samples 1-4. The relative densities of the LLZO-LTO composites of Samples 1-4 also indicate that inclusion of mother powder is not a critical component of the sintering process since decomposition of LTO can also provide a $Li_2O$ sintering atmosphere. Thus, because of this $Li_2O$ sintering atmosphere and lowered sintering temperature, the sintering process is simplified and cheaper.

Ion conductivity of LLZO is acceptable above from $10^{-3}$ to $10^{-4}$ S·cm$^{-1}$. Indeed, all of Samples 1-4 satisfy this criteria (exceeding 0.35 mS·cm$^{-1}$), due to the presence of LTO and its decomposition or reaction products at the grain boundary. However, more important is whether the solid-state battery using LLZO can withstand large current charge and discharge and long-term cycling. CCD is an important evaluation metric and so is considered acceptable at some level to sacrifice ionic conductivity in order to improve CCD. LLZO-LTO sintering without use of mother powder is one advantage of LTO as an additive. Comparative Sample 2 has very low conductivity (0.0123 mS·cm$^{-1}$) since it was not well sintered.

Addition of LTO also leads to an increase in CCD of the Li-garnet. CCD reaches 1.5 mA·cm$^{-2}$ when mass ratio of LLZO to LTO is 100:4 and the composite is fired in an Pt crucible. As mentioned above, sintering of LLZO depends on the $Li_2O$ atmosphere. While MgO and Pt crucibles are relatively stable with $Li_2O$, $Al_2O_3$ and $ZrO_2$ crucibles easily react with $Li_2O$ to form $Li_xAlO_y$ and $Li_xZrO_y$, respectively, at high temperatures, which makes LLZO difficult to sinter and densify. Thus, $Al_2O_3$ and $ZrO_2$ crucibles often require repeated sintering and may be used for LLZO sintering only after forming a passivation layer.

Figure 2:
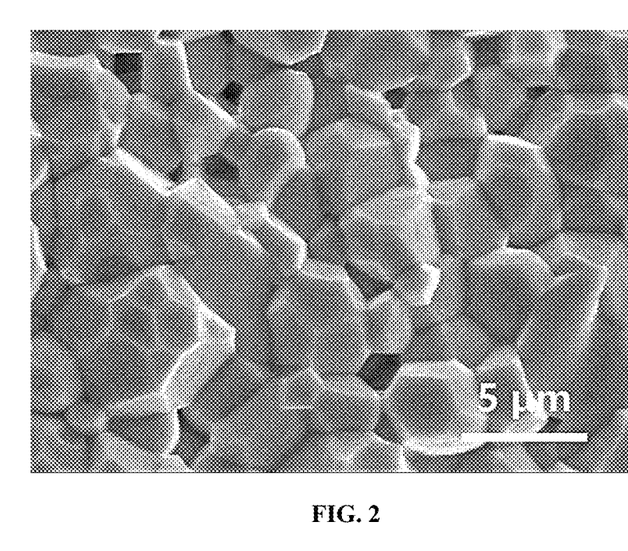
FIG. 2 illustrates a cross-sectional scanning electron microscopy (SEM) image of Comparative Sample 1, according to some embodiments.
Figure 3A:
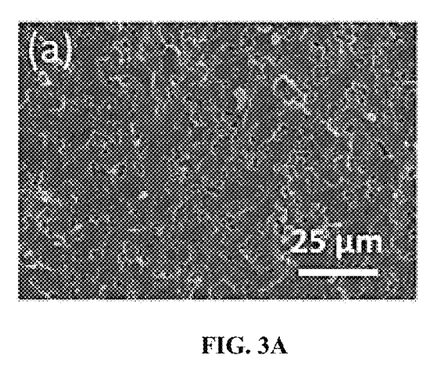
FIGS. 3A-3D illustrate cross-sectional SEM images of Samples 1-4, respectively, according to some embodiments.
Figure 3B:
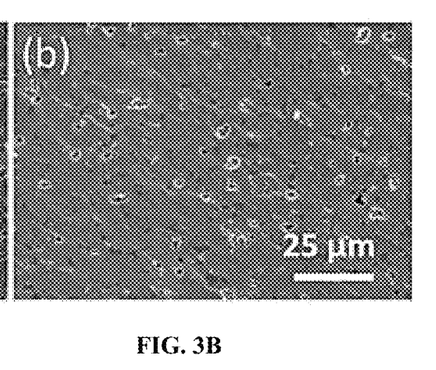
Figure 3C:
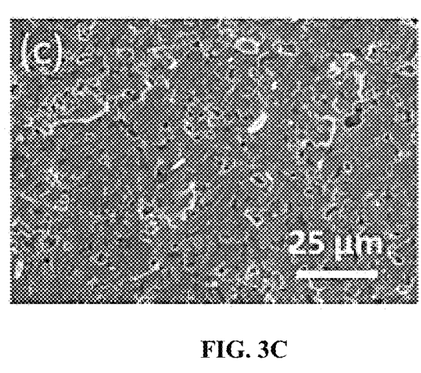
Figure 3D:
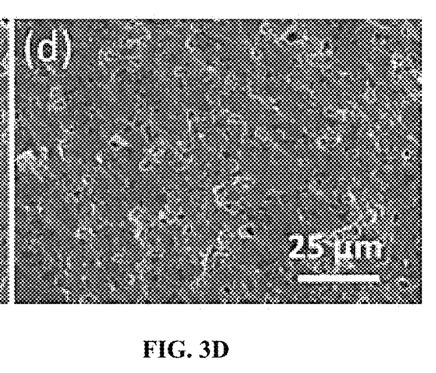
Figure 4A:
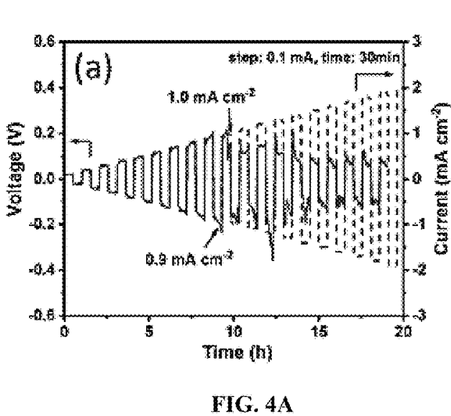
FIGS. 4A-4D illustrate critical current density (CCD) data for solid-state lithium symmetrical batteries comprising Samples 1-4, respectively, according to some embodiments.
Figure 4B:
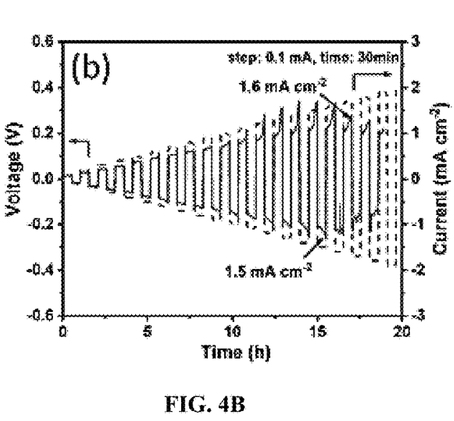
Figure 4C:
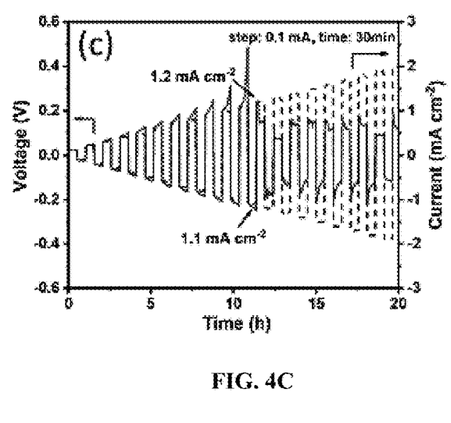
Figure 4D:
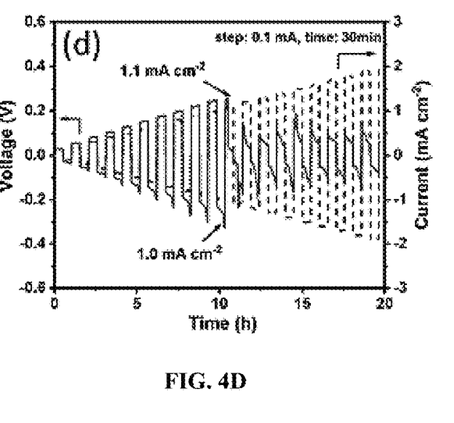

FIG. 2 illustrates a cross-sectional SEM image of Comparative Sample 1 while FIGS. 3A-3D illustrate cross-sectional SEM images of Samples 1-4, respectively, according to some embodiments. As observed in FIG. 2, no obvious impurities are seen in the grain boundary of Comparative Sample 1. When LTO is added, as in Samples 1-4

(FIGS. 3A-3D), it can be seen that LLZO is mainly structured as a transgranular fracture, indicating that the grains are tightly bonded due to the extremely strong fluxing properties of LTO that can bond grain boundaries. In other words, when transgranular fracture occurs, cracks propagate through an inside portion of the grain, which is evidence of strong grain boundary bonding (see FIGS. 3A-3D cross sections). Contrastingly, Comparative Sample 1 shows an intergranular fracture, which is a type of fracture that occurs when cracks propagate along a grain boundary. Fluxing property of a material refers to that material's ability to lower the softening, melting, or liquefaction temperature of a target substance. At the grain boundary, LTO and LLZO react or eutectic during sintering, and the LLZO grain boundary is bonded. The grain boundary is a main path for growth of lithium dendrites. Thus, bonded grain boundaries having strong binding abilities effectively inhibit growth of lithium dendrites.

FIGS. 4A-4D illustrate critical current density (CCD) data for solid-state lithium symmetrical batteries comprising Samples 1-4, respectively, according to some embodiments. With the addition of LTO, the CCD of Li-garnet increases, with the highest value achieved for Sample 2 (mass ratio of LLZO to LTO of 100:4) at 1.5 mA·cm$^{-2}$. In other words, FIGS. 4A-4D illustrate CCD data for a Li/LLZO-LTO/Li symmetrical battery subjected to rate cycling tests at an initial current density of 0.1 mA·cm$^{-2}$, followed by increments of 0.1 mA·cm$^{-2}$. Charge and discharge durations were set to 30 minutes. After current is applied, due to the impedance of the battery, a response voltage appears (in accordance with Ohm's Law). The maximum current density before short circuiting is the CCD, after which point, lithium dendrite growth is observed in the electrolyte, causing the voltage to suddenly drop. Thus, the CCD is used to evaluate the ability of electrolytes to resist lithium dendrite growth.

Figure 5A:
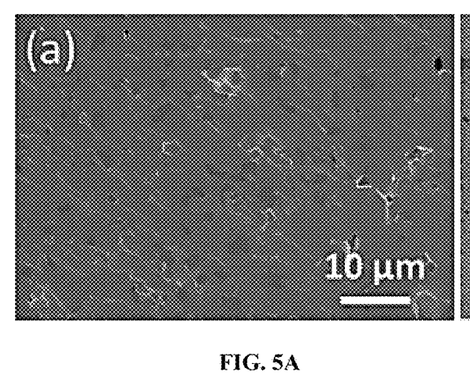
FIGS. 5A-5D illustrate cross-sectional analysis of Sample 2, comprising: a secondary electron (SE) SEM image (FIG. 5A), a back-scattered electron (BSE) SEM image (FIG. 5B), and energy dispersive spectrometer (EDS) point analysis (FIGS. 5C, 5D), according to some embodiments.
Figure 5B:
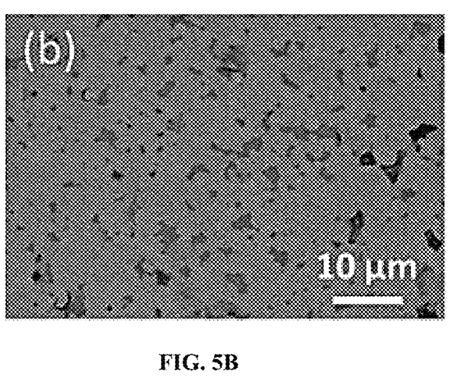
Figure 5C:
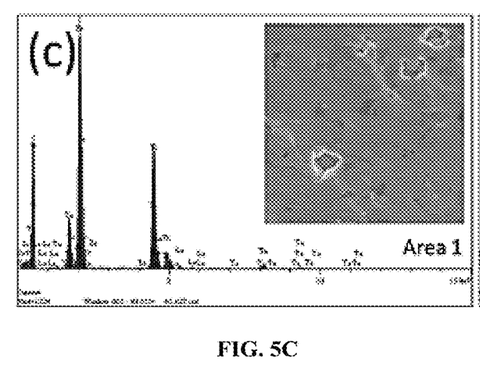
Figure 5D:
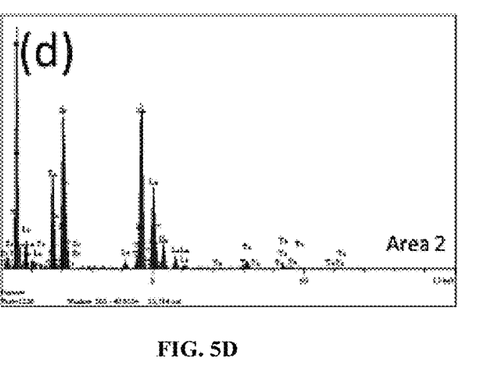

FIGS. 5A-5D illustrate cross-sectional analysis of Sample 2, comprising: a secondary electron (SE) SEM image (FIG. 5A), a corresponding back-scattered electron (BSE) SEM image of FIG. 5A (FIG. 5B), and energy dispersive spectrometer (EDS) point analysis (FIGS. 5C, 5D), according to some embodiments. The contrast of the BSE imaging is caused by a difference in atomic number: elements with larger atomic numbers will have brighter contrasts than elements with smaller atomic numbers. BSE imaging may help to distinguish different phases more clearly. At higher magnifications (FIGS. 5A and 5B is a magnification view of FIG. 3B), regions with different contrast are observed, with LLZO grain boundaries being bonded by LTO and making LLZO grain boundaries undistinguishable (FIG. 5A). Combining the BSE imaging of FIG. 5B, it is determined that phases of the elements in darker contrasting areas have lower atomic numbers (e.g., titanium), with the darkest contrasting areas being the pores. Examination by EDS (FIGS. 5C and 5D) reveals that different areas of Sample 2 may comprise varying elemental compositions, depending on whether sampling was on the major phase (LLZO) or the minor phase (LTO). For example, Area 1 of FIG. 5C lacks lanthanum (La), indicating LTO and its decomposition or reaction products (i.e., at least one of $Li_4Ti_5O_{12}$, $LaTiO_3$, $LaTaO_4$, and $ZrTiO_4$), while Area 2 of FIG. 5D comprises mainly lanthanum (La), zirconium (Zr), tantalum (Ta), and oxygen (O), indicating LLZO. The dark-colored regions correspond to elements with a low atomic number (Ti), and the Ti-containing compounds (e.g., LTO) fill LLZO grain boundaries as a minor phase, blocking the dendrite growth route. In other words, for each of Samples 1-4, LTO exists as the minor or second phase in the grain boundary of the composite garnet and helps to bond the grain boundary to block the Li dendrite growth route, leading to an increase of CCD.

Current research shows that lithium dendrites preferentially grow through the LLZO grain boundaries and induce short circuits in batteries during cycling. Both LZO and LTO can produce $Li_2O$ during the decomposition process, providing a lithium atmosphere for LLZO sintering and promoting densification of the ceramic electrolyte. Differences between LZO and LTO are as follows. The LLZO grain boundary is clear, the substance at the LLZO-LZO grain boundary is mainly $Li_2ZrO_3$, with a small amount of LZO, a crystalline phase and an amorphous phase coexist. LTO will partially react or eutectic with LLZO to bond LLZO grain boundaries, LTO and its decomposition or reaction products being at the grain boundary. LZO and LTO also have different relative stabilities to LLZO: while LZO mainly fills the grain boundary, LTO is bonded at the grain boundary.

Thus, as presented herein, this disclosure relates to improved lithium-garnet composite ceramic electrolytes for enhanced grain boundary bonding of Li-garnet electrolytes in solid-state lithium metal battery applications. Advantages of the formed Li-garnet composite ceramic electrolytes include: (1) a higher critical current density (CCD), since LTO ($Li_xTiO_{(x+4)/2}$ ($0.66 \leq x \leq 4$)) has excellent fluxing properties and are distributed at the LLZO grain boundary, which enhances bonding at the LLZO grain boundary and blocks lithium dendrite growth; and (2) a simplified and cheaper sintering process, because (a) Li-garnet is densified at a lower sintering temperature with the addition of LTO powder; and (b) no mother powder is added during ceramic sintering since LTO is able to provide a $Li_2O$ sintering atmosphere.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. A sintered composite ceramic, comprising:
   a lithium-garnet major phase; and
   a lithium-rich minor phase,
   wherein the lithium-rich minor phase comprises $Li_xTiO_{(x+4)/2}$, with $0.66 \leq x \leq 4$.

2. The sintered composite ceramic of claim 1, wherein the lithium-garnet major phase comprises at least one of:
   (i) $Li_{7-3a}La_3Zr_2LaO_{12}$, with L=Al, Ga or Fe and $0<a<0.33$;
   (ii) $Li_7La_{3-b}Zr_2M_bO_{12}$, with M=Bi or Y and $0<b<1$;
   (iii) $Li_{7-c}La_3(Zr_{2-c}N_c)O_{12}$, with N=In, Si, Ge, Sn, V, W, Te, Nb, or Ta and $0<c<1$, or a combination thereof.

3. The sintered composite ceramic of claim 1, wherein a mass ratio of lithium-garnet major phase to lithium-rich minor phase is in a range of 100:2 to 100:8.

4. The sintered composite ceramic of claim 1, wherein the ceramic has a relative density of at least 90% of a theoretical maximum density of the ceramic.

5. The sintered composite ceramic of claim 1, wherein the ceramic has an ionic conductivity of at least 0.35 mS·cm$^{-1}$.

6. The sintered composite ceramic of claim 1, wherein the ceramic has a critical current density (CCD) of at least 1.0 mA·cm$^{-2}$.

7. The sintered composite ceramic of claim 1, wherein the ceramic has a critical current density (CCD) of at least 1.5 mA·cm$^{-2}$.

8. A battery, comprising:
   at least one lithium electrode; and
   an electrolyte in contact with the at least one lithium electrode,
   wherein the electrolyte is a lithium-garnet composite electrolyte comprising the sintered composite ceramic of claim 1.

9. A sintered composite ceramic, comprising:
   a lithium-garnet major phase; and
   a lithium-rich minor phase,
   wherein the lithium-rich minor phase comprises at least one of: $Li_2TiO_3$, $Li_4Ti_5O_{12}$, $Li_2Ti_3O_7$, $Li_4TiO_4$, or a combination thereof.

10. The sintered composite ceramic of claim 9, wherein the lithium-garnet major phase comprises at least one of:
    (i) $Li_{7-3a}La_3Zr_2L_aO_{12}$, with L=Al, Ga or Fe and 0<a<0.33;
    (ii) $Li_7La_{3-b}Zr_2M_bO_{12}$, with M=Bi or Y and 0<b<1;
    (iii) $Li_{7-c}La_3(Zr_{2-c},N_c)O_{12}$, with N=In, Si, Ge, Sn, V, W, Te, Nb, or Ta and 0<c<1, or a combination thereof.

11. The sintered composite ceramic of claim 9, wherein a mass ratio of lithium-garnet major phase to lithium-rich minor phase is in a range of 100:2 to 100:8.

12. A method of making the composite ceramic, comprising:
    a first mixing of inorganic source materials to form a mixture, including a lithium source compound and at least one transition metal compound;
    a first milling of the mixture to reduce the particle size of the precursors;
    calcining the milled mixture to form a garnet oxide at from 800 to 1200° C.;
    a second mixing of the milled and calcined garnet oxide with at least one minor phase additive to form a second mixture;
    a second milling of the second mixture to reduce the particle size of constituents of the second mixture;
    compacting the second milled second mixture into a green pellet; and
    sintering the green pellet at a temperature ranging from 1000° C. to 1300° C.,
    wherein the minor phase additive comprises $Li_xTiO_{(x+4)/2}$, with 0.66≤x≤4.

13. The method of claim 12, wherein at least one of the lithium source compound or the minor phase additive is present in a stoichiometric excess.

14. The method of claim 12, wherein a mass ratio of the milled and calcined garnet oxide to the at least one minor phase additive is in a range of 100:2 to 100:8.

15. The method of claim 12, wherein no mother powder is applied with the green pellet in the sintering step.

16. The method of claim 12, wherein mother powder is applied with the green pellet in the sintering step.

17. A sintered composite ceramic, comprising:
    a lithium-garnet major phase; and
    a lithium-rich minor phase, the lithium-rich minor phase comprises $Li_xTiO_{(x+4)/2}$, with 0.66≤x≤4
    wherein a mass ratio of lithium-garnet major phase to lithium-rich minor phase is in a range of 100:2 to 100:8, and
    wherein the ceramic comprises at least one of:
       (i) a relative density of at least 90% of a theoretical maximum density of the ceramic,
       (ii) an ionic conductivity of at least 0.35 mS·cm$^{-1}$, and
       (iii) a critical current density (CCD) of at least 1.0 mA·cm$^{-2}$.

18. The sintered composite ceramic of claim 17, wherein the ceramic has a critical current density (CCD) of at least 1.5 mA·cm$^{-2}$.

19. The sintered composite ceramic of claim 17, wherein the lithium-garnet major phase comprises at least one of:
    (i) $Li_{7-3a}La_3Zr_2L_aO_{12}$, with L=Al, Ga or Fe and 0<a<0.33;
    (ii) $Li_7La_{3-b}Zr_2M_bO_{12}$, with M=Bi or Y and 0<b<1;
    (iii) $Li_{7-c}La_3(Zr_{2-c},N_c)O_{12}$, with N=In, Si, Ge, Sn, V, W, Te, Nb, or Ta and 0<c<1, or a combination thereof.

20. The sintered composite ceramic of claim 17, wherein the lithium-rich minor phase comprises at least one of: $Li_2TiO_3$, $Li_4Ti_5O_{12}$, $Li_2Ti_3O_7$, $Li_4TiO_4$, or a combination thereof.

* * * * *